US009639482B2

(12) United States Patent
Horovitz et al.

(10) Patent No.: US 9,639,482 B2
(45) Date of Patent: *May 2, 2017

(54) SOFTWARE CRYPTOPROCESSOR

(71) Applicant: Facebook, Inc., Menlo Park, CA (US)

(72) Inventors: Oded Horovitz, Palo Alto, CA (US); Stephen A. Weis, San Francisco, CA (US); Carl A. Waldspurger, Palo Alto, CA (US); Sahil Rihan, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/820,428

(22) Filed: Aug. 6, 2015

(65) Prior Publication Data

US 2016/0224475 A1    Aug. 4, 2016

Related U.S. Application Data

(63) Continuation of application No. 13/614,935, filed on Sep. 13, 2012, now Pat. No. 9,164,924.

(60) Provisional application No. 61/534,220, filed on Sep. 13, 2011.

(51) Int. Cl.
*G06F 12/14*    (2006.01)
*G06F 21/57*    (2013.01)
*G06F 12/0888*    (2016.01)
*G06F 12/0831*    (2016.01)
(Continued)

(52) U.S. Cl.
CPC ...... *G06F 12/1408* (2013.01); *G06F 12/0833* (2013.01); *G06F 12/0888* (2013.01); *G06F 12/128* (2013.01); *G06F 21/57* (2013.01); *G06F 12/0802* (2013.01); *G06F 2212/1052* (2013.01); *G06F 2212/621* (2013.01); *G06F 2212/69* (2013.01)

(58) Field of Classification Search
CPC ............... G06F 12/1408; G06F 12/128; G06F 12/0833; G06F 12/0888; G06F 21/57; G06F 2212/1052; G06F 2212/69; G06F 2212/621; G06F 12/0802
See application file for complete search history.

(56) References Cited

U.S. PATENT DOCUMENTS

| 5,875,472 | A | 2/1999 | Bauman et al. |
| 6,026,475 | A | 2/2000 | Woodman et al. |
| 6,044,478 | A | 3/2000 | Green et al. |

(Continued)

OTHER PUBLICATIONS

"Intel 64 and IA-32 Architectures Software Developer's Manual, vol. 3 (3A, 3B & 3C): System Programming Guide," Intel Corporation, Dec. 2015, pp. 1-1698. [Part 1].

(Continued)

*Primary Examiner* — Matthew Smithers
(74) *Attorney, Agent, or Firm* — Perkins Coie LLP

(57) ABSTRACT

Security of information—both code and data—stored in a computer's system memory is provided by an agent loaded into and at run time resident in a CPU cache. Memory writes from the CPU are encrypted by the agent before writing and reads into the CPU are decrypted by the agent before they reach the CPU. The cache-resident agent also optionally validates the encrypted information stored in the system memory. Support for I/O devices and cache protection from unsafe DMA of the cache by devices is also provided.

20 Claims, 3 Drawing Sheets

US 9,639,482 B2

Page 2

(51) Int. Cl.
*G06F 12/128* (2016.01)
*G06F 12/0802* (2016.01)

(56) References Cited

U.S. PATENT DOCUMENTS

| | | | |
|---|---|---|---|
| 6,129,458 | A | 10/2000 | Waters et al. |
| 6,223,256 | B1 | 4/2001 | Gaither et al. |
| 6,389,442 | B1 | 5/2002 | Yin et al. |
| 6,697,927 | B2 | 2/2004 | Bonola |
| 6,970,960 | B1 | 11/2005 | Sarfati |
| 7,266,661 | B2 | 9/2007 | Walmsley et al. |
| 7,434,000 | B1 | 10/2008 | Barreh et al. |
| 7,577,851 | B2 | 8/2009 | Inamura et al. |
| 7,657,756 | B2 | 2/2010 | Hall |
| 7,671,864 | B2 | 3/2010 | Román et al. |
| 7,774,622 | B2 | 8/2010 | Mitra |
| 8,037,250 | B1 | 10/2011 | Barreh et al. |
| 8,135,962 | B2 | 3/2012 | Strongin et al. |
| 8,352,718 | B1 | 1/2013 | Rao et al. |
| 8,615,665 | B2 | 12/2013 | Fitton et al. |
| 8,726,364 | B2 | 5/2014 | Smith et al. |
| 8,738,932 | B2 | 5/2014 | Lee et al. |
| 8,782,433 | B2 | 7/2014 | Kaabouch et al. |
| 8,812,796 | B2 | 8/2014 | Gray et al. |
| 8,886,959 | B2 | 11/2014 | Tamiya et al. |
| 8,904,477 | B2 | 12/2014 | Walker et al. |
| 8,924,743 | B2 | 12/2014 | Wolfe et al. |
| 8,949,797 | B2 | 2/2015 | Christodorescu et al. |
| 8,990,582 | B2* | 3/2015 | Maino ............... G06F 12/0811 713/190 |
| 9,164,924 | B2* | 10/2015 | Horovitz ............ G06F 12/1408 |
| 9,477,603 | B2 | 10/2016 | Waldspurger et al. |
| 2002/0004860 | A1 | 1/2002 | Roman |
| 2002/0116595 | A1 | 8/2002 | Morton et al. |
| 2002/0138700 | A1 | 9/2002 | Holmberg et al. |
| 2003/0033480 | A1 | 2/2003 | Jeremiassen et al. |
| 2003/0065892 | A1 | 4/2003 | Bonola et al. |
| 2003/0188178 | A1* | 10/2003 | Strongin ............ G06F 12/1408 713/193 |
| 2003/0236947 | A1 | 12/2003 | Yamazaki et al. |
| 2004/0111639 | A1 | 6/2004 | Schwartz et al. |
| 2006/0015748 | A1* | 1/2006 | Goto ..................... G06F 21/52 713/190 |
| 2006/0020941 | A1 | 1/2006 | Inamura et al. |
| 2006/0080553 | A1 | 4/2006 | Hall et al. |
| 2006/0179228 | A1 | 8/2006 | Thompson et al. |
| 2007/0239938 | A1 | 10/2007 | Pong et al. |
| 2008/0010413 | A1 | 1/2008 | Kailas et al. |
| 2008/0022160 | A1 | 1/2008 | Chakraborty et al. |
| 2008/0109660 | A1 | 5/2008 | Mitra et al. |
| 2008/0229118 | A1* | 9/2008 | Kasako ................ G06F 21/80 713/193 |
| 2008/0235804 | A1 | 9/2008 | Bade et al. |
| 2009/0094601 | A1 | 4/2009 | Vstovskiy |
| 2009/0328195 | A1 | 12/2009 | Smith et al. |
| 2010/0005300 | A1 | 1/2010 | Klotsche et al. |
| 2010/0062844 | A1 | 3/2010 | Crowder, Jr. et al. |
| 2010/0064144 | A1 | 3/2010 | Kaabouch et al. |
| 2010/0115620 | A1 | 5/2010 | Alme et al. |
| 2010/0281223 | A1 | 11/2010 | Wolfe et al. |
| 2010/0281273 | A1* | 11/2010 | Lee .................... G06F 21/72 713/190 |
| 2010/0287385 | A1 | 11/2010 | Conte et al. |
| 2011/0022818 | A1 | 1/2011 | Kegel et al. |
| 2011/0040940 | A1 | 2/2011 | Wells et al. |
| 2011/0047362 | A1 | 2/2011 | Eichenberger et al. |
| 2011/0113260 | A1* | 5/2011 | Ma ..................... G09C 1/00 713/193 |
| 2011/0167278 | A1 | 7/2011 | Goto et al. |
| 2011/0258610 | A1 | 10/2011 | Aaraj et al. |
| 2011/0314468 | A1 | 12/2011 | Zhou et al. |
| 2012/0124296 | A1 | 5/2012 | Bryant et al. |
| 2012/0317569 | A1 | 12/2012 | Payne, Jr. |
| 2013/0067245 | A1 | 3/2013 | Horovitz et al. |
| 2013/0125244 | A1 | 5/2013 | Sugano et al. |
| 2013/0159726 | A1 | 6/2013 | McKeen et al. |
| 2013/0191651 | A1* | 7/2013 | Muff .................. G06F 12/1027 713/193 |
| 2013/0254494 | A1* | 9/2013 | Oxford ............... G06F 12/1466 711/145 |
| 2013/0263121 | A1 | 10/2013 | Franke et al. |
| 2014/0007087 | A1 | 1/2014 | Scott-Nash |
| 2014/0108649 | A1 | 4/2014 | Barton et al. |
| 2014/0173275 | A1 | 6/2014 | Johnson et al. |
| 2014/0201452 | A1 | 7/2014 | Meredith et al. |
| 2015/0067265 | A1 | 3/2015 | Weis et al. |
| 2015/0089152 | A1 | 3/2015 | Busaba et al. |
| 2015/0089153 | A1 | 3/2015 | Busaba et al. |
| 2015/0089154 | A1 | 3/2015 | Busaba et al. |
| 2015/0089155 | A1 | 3/2015 | Busaba et al. |
| 2015/0089159 | A1 | 3/2015 | Busaba et al. |
| 2015/0089502 | A1 | 3/2015 | Weis et al. |
| 2015/0134932 | A1 | 5/2015 | Mcnairy |
| 2015/0186295 | A1* | 7/2015 | Savagaonkar ...... G06F 12/1408 713/193 |
| 2015/0227744 | A1 | 8/2015 | Horowitz et al. |
| 2015/0269091 | A1 | 9/2015 | Horowitz et al. |
| 2015/0378731 | A1 | 12/2015 | Lai |

OTHER PUBLICATIONS

"Intel 64 and IA-32 Architectures Software Developer's Manual, vol. 3 (3A, 3B & 3C): System Programming Guide," Intel Corporation, Dec. 2015, pp. 1-1698. [Part 2].

"Intel 64 and IA-32 Architectures Software Developer's Manual, vol. 3 (3A, 3B & 3C): System Programming Guide," Intel Corporation, Dec. 2015, pp. 1-1698. [Part 3].

"Intel 64 and IA-32 Architectures Software Developer's Manual, vol. 3 (3A, 3B & 3C): System Programming Guide," Intel Corporation, Dec. 2015, pp. 1-1698. [Part 4].

"Intel 64 and IA-32 Architectures Software Developer's Manual, vol. 3 (3A, 3B & 3C): System Programming Guide," Intel Corporation, Dec. 2015, pp. 1-1698. [Part 5].

"Intel 64 and IA-32 Architectures Software Developer's Manual, vol. 3 (3A, 3B & 3C): System Programming Guide," Intel Corporation, Dec. 2015, pp. 1-1698. [Part 6].

"Intel 64 and IA-32 Architectures Software Developer's Manual, vol. 3 (3A, 3B & 3C): System Programming Guide," Intel Corporation, Dec. 2015, pp. 1-1698. [Part 7].

Trusted Computing Group, [retrieved on Nov. 12, 2015], Retrieved from the internet: <http://www.trustedcomputinggroup.org>, 2015, 1 page.

Cache management via page coloring, Wikipedia, [retrieved on Nov. 12, 2015], Retrieved from the Internet: <http://en.Wikipedia.org/wiki/cache_coloring>, Nov. 6, 2015, 2 pages.

Hardware security module, Wikipedia, [retrieved on Nov. 12, 2015], Retrieved from the Internet: <http://en.wikipedia.org/wiki/hardware_security_module>, Oct. 21, 2015, 5 pages.

Intel® Trusted Execution Technology (Intel® TXT), Software Development Guide, Measured Launch Environment Developer's Guide, Revision 012, Document: 315168-012, [retrieved on Nov. 12, 2015], Retrieved from the internet: <http://download.Intel.com/technology/security/downloads/315168.pdf>, Jul. 2015, pp. 1-169.

Anati Ittai, et al., "Innovative Technology for CPU Based Attestation and Sealing", Proceedings of the Second International Workshop on Hardware and Architectural Support for Security and Privacy (HASP '13), Jun. 2013, pp. 1-7.

Baumann, A., et al., "Shielding Applications from an Untrusted Cloud wth Haven," Proceedings of the 11th USENIX Symposium on Operating Systems Design and Implementation, Oct. 6-8, 2014, pp. 267-283.

Bellard, F., "QEMU, a fast and portable dynamic translator", Proceedings of the USE NIX 2005 Annual Technical Conference, FREEN/X Track, Apr. 2005, pp. 41-46.

Bochs, "The Cross-Platform IA-32 Emulator" [retrieved on Aug. 26, 2015] Retrieved from the Internet: <http://bochs.sourceforge.net/>, May 3, 2015, 2 pages.

Bugnion, E. et al., "Compiler-directed page coloring for multiprocessors", Proceedings of the Seventh International Conference on

(56) References Cited

OTHER PUBLICATIONS

Architectural Support for Programming Languages and Operating Systems (ASPLOS VII), ACM, Oct. 1996, 12 pages.
Chen, X. et al., "Overshadow: A Virtualization-Based Approach to Retrofitting Protection in Commodity Operating Systems", Proceedings of the Thirteenth International Conference on Architectural Support for Programming Languages and Operating Systems (ASPLOS '08), ACM, Mar. 1-5, 2008, pp. 2-13.
Chen, X., et al., "Operating System Controlled Processor-Memory Bus Encryption", in Proceedings of Design, Automation and Test in Europe, 2008, (DATE'08), IEEE, pp. 1154-1159.
Iyer, Ravi, "COoS: A Framework for Enabling OoS in Shared Caches of CMP Platforms," In Proceedings of the 18th Annual International Conference on Supercomputing (ICS '04), ACM, Jun. 26-Jul. 1, 2004, pp. 257-266.
McKeen, F., et al., "Innovative Instructions and Software Model for Isolated Execution", Proceedings of the Second International Workshop on Hardware and Architectural Support for Security and Privacy (HASP '13), ACM, Jun. 2013, pp. 1-8.
Muller, T. et al., "TRESOR Runs Encryption Securely Outside RAM", in Proceedings of the 20th USENIX Security Symposium [retrieved Nov. 12, 2015] Retrieved from the Internet: <http://www.usenix.org/events/sec11/tech/full_papers/muller.pdf>, Aug. 2011, pp. 1-16.
Peterson, Peter A.H., "Cryptkeeper: Improving Security with Encrypted RAM", in IEEE International Conference on Technologies for Homeland Security (HST 2010), Nov. 2010, pp. 1-7.
Ports, Dan R.K. et al., "Towards application security on untrusted operating systems", Proceedings of the Third Conference on Hot Topics in Security (HOTSEC '08), Jul. 2008, 7 pages.
Rosenblum, M., et al., "Using the SimOS machine simulator to study complex computer systems", ACM Transactions on Modeling and Computer Simulation, vol. 7, Issue 1, Jan. 1997, pp. 78-103.
Vasudevan, A., et al. "CARMA: A Hardware Tamper-Resistant Isolated Execution Environment on Commodity x86 Platforms", in Proceedings of the ACM Symposium on Information,Computer and Communications Security (ASIACCS 2012), May 2012, 5 pages.
Zhang, X. et al. 2009, "Towards practical page coloring-based multicore cache management", Proceedings of the 4th ACM European Conference on Computer Systems (EuroSys '09), ACM, Apr. 1-3, 2009, pp. 89-102.
U.S. Appl. No. 13/614,935, of Horovitz, O., et al. filed Sep. 13, 2012.
U.S. Appl. No. 14/479,239 of Horovitz, O. et al., filed Aug. 5, 2014.
U.S. Appl. No. 14/497,111 of Horovitz, O. et al., filed Sep. 25, 2014.
U.S. Appl. No. 14/504,203 of Horovitz, O. et al., filed Oct. 1, 2014.
U.S. Appl. No. 14/618,099 of Horovitz, O. et al., filed Feb. 10, 2015.
U.S. Appl. No. 14/663,217 of Horovitz, O. et al., filed Mar. 19, 2015.
Restriction Requirement mailed Aug. 27, 2013, for U.S. Appl. No. 13/614,935 of Horovitz, O. et al., filed Sep. 13, 2015.
Non-Final Office Action mailed Nov. 18, 2013, for U.S. Appl. No. 13/614,935 of Horovitz, O., filed Sep. 13, 2012.
Advisory Action mailed Aug. 19, 2014, for U.S. Appl. No. 13/614,935 of Horovitz, O. et al., filed Sep. 13, 2015.
Non-Final Office Action mailed Feb. 19, 2015, for U.S. Appl. No. 13/614,935 of Horovitz, O., filed Sep. 13, 2012.
Notice of Allowance mailed Jul. 15, 2015, for U.S. Appl. No. 13/614,935 of Horovitz, O., filed Sep. 13, 2012.
Final Office Action mailed Jun. 5, 2014, for U.S. Appl. No. 13/614,935 of Horovitz, O., filed Sep. 13, 2012.
International Search Report and Written Opinion of International Application No. PCT/US12/55210, Jan. 25, 2013, 11 pages.
Extended European Search Report mailed Aug. 5, 2015, for European Patent Application No. 12831564.5, 7 pages.
Notice of Allowance mailed Jun. 27, 2016, for U.S. Appl. No. 14/479,239 of Waldspurger, C. et al., filed Sep. 5, 2014.
Non-Final Office Action mailed Jul. 28, 2016, for U.S. Appl. No. 14/497,111 of Horovitz, O. et al., filed Sep. 25, 2014.
Non-Final Office Action mailed Jul. 27, 2016, for U.S. Appl. No. 14/663,217 of Horovitz, O. et al., filed Mar. 19, 2015.
Deayton, Peter et al., "Set Utilization Based Dynamic Shared Cache Partitioning", Parallel and Distributed Systems (ICPADS), 2011 IEEE 17th International Conference, Dec. 7-9, 2011, pp. 284-291.
Li, Zhiyuan , "Reducing Cache Conflicts by Partitioning and Privatizing Shared Arrays", Parallel Architectures and Compilation Techniques Proceedings, International Conference on 1999, 1999, pp. 183-190.
Rajimwale, Abhishek et al., "Coerced Cache Eviction and Discreet Mode Journaling: Dealing with Misbehaving Disks", IEEE/IFIP 41st International Conference on Dependable Systems & Networks (DSN), Jun. 27-30, 2011, pp. 518-529.
First Office Action mailed Aug. 2, 2016, for Japanese Patent Application No. 2014-530797, 7 pages.
U.S. Appl. No. 15/274,981 of Waldspurger, C., et al., filed Sep. 23, 2016.
Non-Final Office Action mailed Nov. 15, 2016, for U.S. Appl. No. 14/618,099 of Horovitz, O. et al., filed Feb. 10, 2015.
Non-Final Office Action mailed Nov. 30, 2016, for U.S. Appl. No. 14/504,203 of Horovitz, O. et al., filed Oct. 1, 2014.
Final Office Action mailed Dec. 27, 2016, for U.S. Appl. No. 14/497,111 of Horovitz, O. et al., filed Sep. 25, 2014.
Final Office Action mailed Jan. 13, 2017, for U.S. Appl. No. 14/663,217 of Horovitz, O. et al., filed Mar. 19, 2015.
Second Office Action mailed Dec. 6, 2016 for Japanese Patent Application No. 2014-530797, 4 pages.

\* cited by examiner

SOFTWARE CRYPTOPROCESSOR

CROSS-REFERENCE TO RELATED APPLICATIONS

This application is a continuation application of U.S. patent application Ser. No. 13/614,935, filed Sep. 13, 2012, which claims priority to U.S. Provisional Patent Application No. 61/534,220 filed Sep. 13, 2011.

FIELD OF THE INVENTION

This invention relates to computer security, in particular, to establishing trust in the integrity and privacy of software and hardware components.

BACKGROUND

Since the beginning of electronic computing, there has been a never-ending concern that the hardware and/or software comprising the computers—to say nothing of user and other data—has been deliberately or inadvertently corrupted. As the complexity of computers increases, so does this concern. At the heart of the problem is trust, or the lack thereof. Software, hypervisors (in virtualized computer systems), operating systems (OS) and applications and the like that run on modern computers, servers, mobile devices, etc., assume, for example, that the hardware on which they are running can be trusted—when software stores information in memory, it expects the information to be the same the next time it is read from memory and not tampered with or leaked to an attacker.

With an increase of platform modularization, it is possible for a human operator or a hardware component to modify the state of the software out-of-band of its execution. For example, every device that is connected to main memory through an I/O bus (for example, a PCI bus) can communicate with the software by means of writing and reading not only to shared areas but also from the application private state that is stored in the main memory. For these and many other reasons, the problem of trust is more prevalent today than ever before, especially as more and more organizations rely on service providers or manufacturers to run their software and build the systems on which they run.

An attacker can successfully penetrate a software system just by observing, without modifying, the state of the application. One example of such an attack consists of just observing data stored in memory (for example, credit card numbers, personally identifying information, etc.) without requiring access credentials such as passwords. Another example is known as a "cold-boot" attack, which exploits the physical property of system memory (in particular, DRAM) that its contents are retained for a short time even when the power is removed. In such attacks, a human can force a reboot of the system, often just by causing a loss of power or reset, and then, while data is still latent, reboot into a small (even USB-based) OS that then can observe or copy the data from the supposedly secure hardware; alternatively, the user can quickly remove the main memory device from one host and mount it on another host in order to read its content. The cold-boot attack is explained, for example, in http://citp.princeton.edu/memory/. By observing the state of the software, that is, the contents of memory, the attacker can then obtain secrets and credentials (for example, keys) that later allow the attacker entry through the front door of the software stack.

Consequently, a whole branch of computer science is dedicated to finding solutions to the problem of trust. Some of the concepts and attempted solutions include the following.

"Data-at-rest" encryption involves encrypting data at the storage back-end, that is, data that is not, at a given moment, being transmitted between devices or otherwise processed. Although this method provides a relative easy and straightforward way to encrypt substantially the entire non-volatile storage, it does not protect data that is currently being processed or used. Yet another drawback is that any keys used to encrypt the "at-rest" data must be stored and persist as long as the data; keys themselves are subject to theft while in memory, which would defeat the encryption as a whole.

"Cryptoprocessors" have been in use since the early days of computers. In broad terms, a conventional, modern cryptoprocessor is some form of microprocessor (including smartcards) that includes built-in hardware support for cryptographic operations. In short, existing cryptoprocessor-based security solutions rely on dedicated or specialized hardware and typically also on modifications to the processor circuitry itself. One variant of this concept is "in-line processor RAM encryption", which is a hardware-based approach to the problem in which the CPU integrates encryption logic into the cache circuitry, and which enables encryption/decryption whenever cache data is either evicted or filled. Although commodity operating systems can run on some known cryptoprocessors, at present there is no cryptoprocessor implementation, in the sense of full-memory encryption, for an x86 architecture.

The Trusted Computing Group TCG (http://www.trustedcomputinggroup.org) works on a solution that can attest to the software that has started to execute on a processor after a system boot, or in the case of Intel's TXT (Trusted Execution Technology) (http://download.Intel.com/technology/security/downloads/315168.pdf), whenever a software component decides to execute in a measured environment. Once the system has started to run the measured code, however, the TCG framework no longer provides additional run-time protection.

"Messaging encryption" is a system concept for secure communication (for example, VPN, IPsec, SSL) that allows hosts or other software entities to communicate privately over public networks. Note that this is a form of encryption for "data-in-motion". Although this method provides a level of security for data in transit between two entities, it is not designed or suitable for protecting data being otherwise processed before or after transit.

Various researchers have started to experiment with using private storage in the CPU to hide data, in particular the x86 internal state, from the main memory. One such example is TRESOR (http://www.usenix.org/events/sec11/tech/full_papers/muller.pdf), which contains references to "frozen cache". Research in this area has demonstrated the ability to protect some data from reaching RAM, but not the entire software stack. This solution therefore has the weakness that an attacker can easily modify other data that is exposed to the RAM and modify its software component to expose all secrets.

"Cache management via page coloring" (http://en.Wikipedia.org/wiki/cache_coloring) is a method to split the cache content between multiple applications running on a single x86 processor. This method divides the total set of physical pages into pages that are "known" not to conflict "as far as cache placement is concerned", assuming that if each application allocates only from one pool of pages having color A, it will never contend with another application that allocates from another pool of pages having color B. In this way, the application using color A cannot cause evictions of cached data associated with application using color B, and vice versa, but it does not provide any guarantee as to which pages in a given pool are currently in the cache or in system memory.

DETAILED DESCRIPTION

Figure 1:
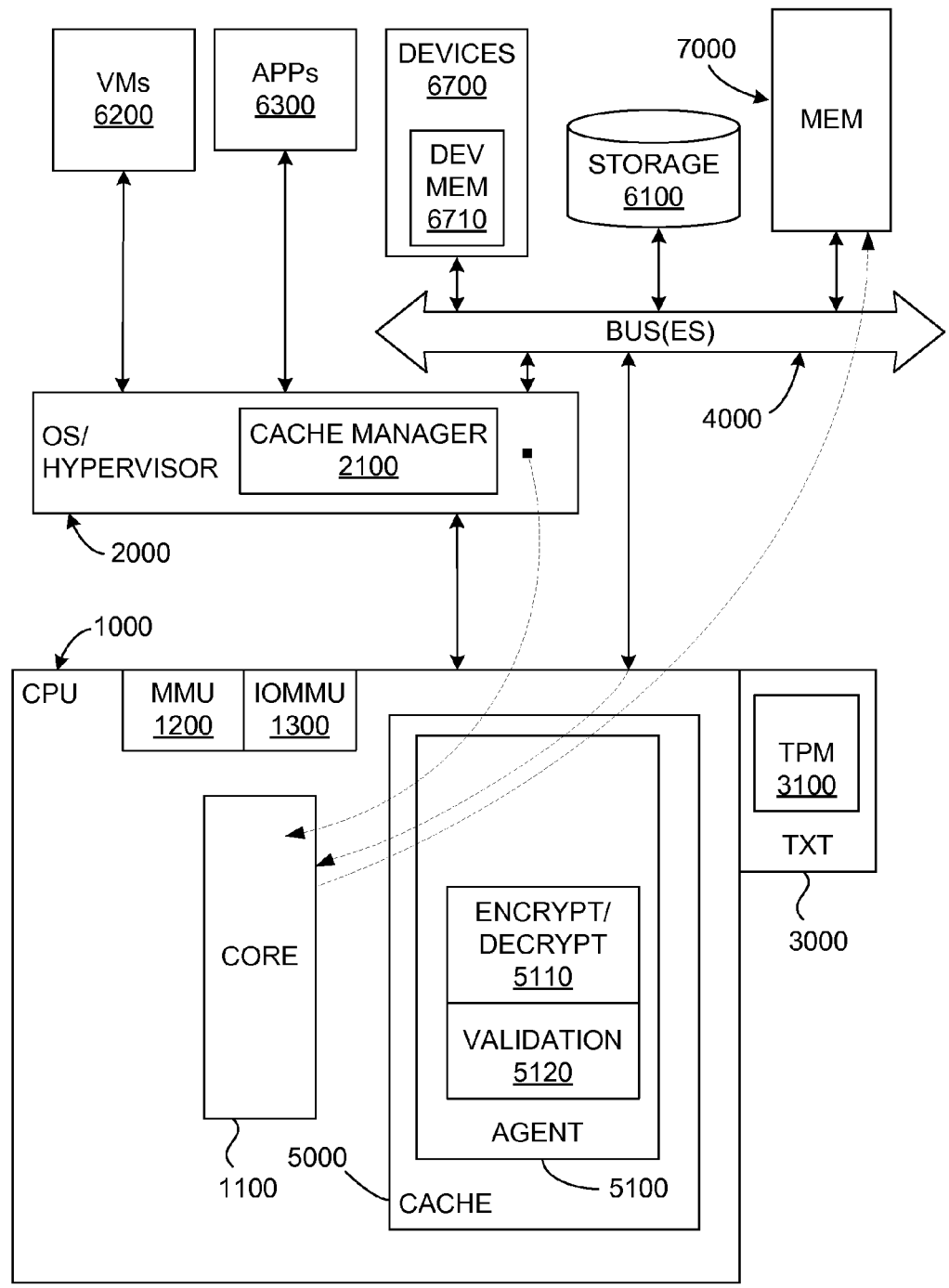
FIG. 1 illustrates the main hardware and software components of the invention, as well as the main principles of operation.

Although different implementations of the invention may operate with more relaxed requirements and assumptions, in broadest terms, this invention provides an "agent" (either software or "firmware") contained within the CPU cache that encrypts/decrypts and/or validates/authenticates data and/or instructions that are passed to or from the processor core(s). As such, the invention provides a cryptoprocessor that is embodied as software—requiring no specific hardware support or modifications—onboard the main processor itself. This cached software module/agent thus forms a software "wall" around the CPU core, which makes available instructions and data coming in to the core in the proper, unencrypted form for processing, but that encrypts all outgoing data before the CPU stores it in any external modules, including system memory, device memory, etc. Thanks to this, with at most limited and fabricator-level exceptions (see below), the only software (including the notion of "firmware") or hardware that need be trusted during run-time is the processor and the code that defines the agent. In the context of this discussion, "trusted" means that the main processor is expected to behave according to its specifications and execute the associated software stack without deviation from publicly available processor specifications. In other words, the main processor itself is trusted to be free of backdoors that might allow attacks on the cached software. According to this aspect, the level of trust of the overall system will therefore be as great as the trust for the main processor itself, together with the cached agent. It will then be possible for end users to load arbitrary applications and process sensitive information knowing that neither human operators nor malicious hardware or software can attack their sensitive data or applications.

One other potential limitation to the level of trust would stem from the theoretical ability of a malicious actor to examine the state of the CPU at run-time. In general, however, tampering with the internal state of a running CPU is a difficult and expensive operation such that the level of trust that the system described here allows is still greater than for conventional solutions.

Where the processor (together with the cached agent) is the only trusted component, there is greatly reduced complexity as compared with existing systems, which can be trusted only if one also trusts that each component and human operator is working according to specifications. Of course, human operators cannot be "tested" the same as computer components, which makes trust all the more difficult. Even if one were to trust all components and humans, it would still be necessary to monitor and evaluate whether their performance honors the software stack privacy and integrity. In short, it is much more difficult to trust the integrity of many different links in a chain than it is to trust the integrity of a single link that is known to be strong.

In one embodiment, existing software solutions (hypervisors, operating systems, and applications) may be run with only a minimal change in the lowermost component of the software stack, such as the operating system (OS) or hypervisor. In particular, in this embodiment, the agent is itself included as a component of the OS/hypervisor, either as a cache-management module, or as a part of this module, which is resident in cache at run-time. This provides support for general-purpose applications and also support for legacy applications. This contrasts with the "hardware security module" HSM (http://en.wikipedia.org/wiki/hardware_security_module), which is a dedicated external component designed to protect a specific application but that has a limited programming interface that cannot run arbitrary applications.

In general, this invention focuses on the use of the main processor cache, which is far smaller than the system memory installed in modern systems. Two changes need to be made in the software stack in order to execute in this new architecture. These changes can be made in the OS/hypervisor, whichever runs directly on the main processor. First, in any OS/hypervisor, there is some code that handles interrupts sent by hardware, as well as software faults triggered by applications. This "always present" code generally can fit inside the main processor cache. Second, most modern OSes/hypervisors assume a large main memory, although that assumption is not an absolute requirement—applications are likely to work correctly even if only very limited amounts of physical memory are available, such as with the help of virtual memory; however, without making a change in the OS/hypervisor, performance will suffer.

According to various aspects, systems and methods are provided to manage the main processor cache so that a software agent always controls which parts of main memory can occupy the cache. Some processors are already configured to enable such granular control and in such cases the configured instructions and procedures can be used to implement this feature. Some main processors lack the granular control over their memory cache, however, and will therefore require careful software algorithms to manipulate the main processor into a state in which a software agent can control which part of the memory occupies the cache at any given time.

The x86 processor is an example of a processor that lacks granular cache control. The x86 class of processors is well known in the industry and has memory cache controls that are listed, for example, in the manual "Intel 64 and IA-32 Architectures Software Developer's Manual, Volume 3: System Programming Guide" available from Intel Corp. In order to achieve control over the cache content, however, the main processor would need to notify the software stack whenever a cache line is about to be evicted, which in turn allows the software stack to change the cache line before it is written back to main memory. The x86 lacks such software notification.

FIG. 1 is a simplified illustration of a computer system that could embody different aspects of the invention. At the heart of the system is a main processor CPU 1000, which includes at least one core 1100 that receives and processes instructions using well-known components and circuitry. A CPU will of course include many different components, ranging from internal clock circuitry to an ALU, but since these are well-known, they are not illustrated even though they may be assumed to be part of the CPU 1000.

System-level software such as an operating system (OS) and/or hypervisor 2000 will typically be included to perform well-known functions. Virtual machines 6200 and applications 6300 are illustrated as running under the supervision of the OS/hypervisor 2000. A hypervisor will typically not be necessary if no virtual machines are included; both options are illustrated in FIG. 1 merely for the sake of completeness. Various devices 6700, which can encompass almost any known devices such as storage, network, human interface, chipset, etc., may also be included. Some form of storage 6100 such as a hard disk system will normally be included along with less typically less persistent but faster memory devices such as system memory 7000.

In FIG. 1, the system memory 7000 is shown as a single component MEM, but this is merely for the sake of clarity; in most implementations, the system memory 7000 will comprise different high-speed memory devices that may be included either stand-alone, such as for the main system memory, dedicated and located within different devices, etc. RAM, flash memory, flash-backed RAM, phase-change memory (PCM) and other such technologies may also be encompassed by the general term "system memory 7000" for purposes of this invention. From the perspective of the CPU, the system memory 7000 is therefore some addressable memory space, which does not need to be within one component or contiguous.

A typical computer system will include various buses 4000 such as an address bus, a data bus, possibly a dedicated I/O bus, etc. In cases where one or more devices is remote, there will generally also be some form of network channel, bus, or point-to-point interconnects such as the Intel QPI (QuickPath Interconnect), which is not separately shown merely for the sake of simplicity.

An essential component to this invention is the cache 5000, which is part of the CPU 1000. The general structure and properties of a cache are well-understood in the field of computer science and will therefore not be described further here.

Unique to this invention, however, is an agent 5100, which is a software component that includes an encryption/decryption module 5110 as well as an optional validation module 5120. In one embodiment, the agent 5100 is a software component within the system software 2000 and which resides in the cache 5000 at run time. In some implementations, the system software 2000 may include a cache management module 2100 that also performs various cache-related tasks; in these cases, it is possible for the agent 5100 to be either identical to or a sub-component of such a cache management module 2100. The agent 5100 may be included either as a dedicated component in the system software, or be incorporated into any other appropriate system software component. In another embodiment, the agent 5100 may be an independent component resident in the cache, in which case the cache management module 2100 may not be necessary and the OS/hypervisor may be an unmodified system software layer.

Different processor architectures will naturally have different cache structures and some have more than one. For the purposes of this invention, if there are options, it is preferable to select a cache that is large enough to hold all the code defining the cache management module 2100/agent 5100 because this will reduce the traffic (similar to memory-to-disk swapping and paging) between the cache and the main memory, and the accompanying increase in encryption/decryption activity this brings. Other caches may be chosen, however, if one is willing to accept that not all components of the agent, plus any other cached software, may fit at once in the cache. In many existing processors, the LLC (last-level cache) will be most suitable because it is generally the largest. In x86 systems, this will be the L3 cache, which at least partially includes the lower level L1 and L2 caches such that when a lower level cache has a miss, it will read through the next level cache, not directly from memory.

As is illustrated by the dashed lines, instructions and data submitted to and transmitted back from the core can be made visible to and be intercepted by the agent 5100. According to one aspect of the invention, whenever information (data and/or instructions) is transmitted from the CPU, in particular from the core 1100 or some other internal CPU component, this transmission is intercepted by the agent 5100 and is encrypted by the agent module 5110 before it is returned outside of the logical boundaries of the CPU 1000, in particular, to system memory 7000. Instructions and data inbound to the CPU core or internal components are then decrypted by the agent 5110 before they are submitted for processing. In some implementations, all in-coming and out-going (from the perspective of the CPU) information may be decrypted and encrypted, although in other implementations this encryption and decryption could be carried out only for certain portions of system memory 7000. The system designer may freely choose which encryption and decryption algorithm the module 5110 uses. The designer will then consider such factors as the available size within the cache for the agent and how much performance he is willing to sacrifice to obtain higher levels of cryptologic security. Suitable procedures will be implemented to store the encryption keys, typically within the cache 5000 itself, and preferably only for the duration of key use.

It would in general be unnecessary and cause unacceptable performance degradation to individually encrypt/decrypt every byte of information passing between the CPU and the main system memory by way of the cached agent 5100. Instead, a larger granularity will generally be preferable. In x86 systems, for example, the virtual memory subsystem usually moves information at the level of pages. In one implementation, the agent 5100 therefore traps on accesses at the granularity of full pages and since most software execution will generate page-size traffic, the agent will typically encrypt and decrypt by page. This operation can be triggered, for example, by detecting the page faults that are generated to instruct a hypervisor (in virtualized embodiments) to fetch the next portion of system memory that is necessary for making progress in the execution of software.

In addition to application execution, the agent 5100 might have its own meta-data that may be too big to fit inside the cache. Such meta-data may be stored in encrypted form in main memory and be accessed proactively by the agent, not requiring triggering by a page fault; consequently, such accesses do not need to be at the same page-size granularity.

It is not necessary for the agent to execute software directly on the CPU; rather, the agent could be configured to interpret the software, for example, unmodified virtual machines and applications. This would allow the agent to proactively detect a need for memory access by the software and allow it to read in such memory in smaller chunks, thereby improving throughput and performance. This is a design choice, which might also include such known techniques as pre-fetching and code scanning. One example of an interpreter that might be used is an x86 instruction set interpreter.

Although the system software 2000, the virtual machines 6200 and the applications 6300 are often conceptualized as separate entities in system diagrams such as FIG. 1, these are of course in reality respective bodies of data and code that are stored as any other body of "1s" and "0s" in system storage 6100 and are loaded either as a whole or in units such as pages into the higher-speed system memory 7000 for execution under the control of the system software 2000. The contents of their code and data in respective memory address locations may therefore be cached by the CPU just as any other in order to improve performance. One other consequence of this, however, is that the agent 5100 can secure even the code that defines such software components just like any other information stored in system memory.

Even at this point, one can see a difference between this invention and known solutions. For one, except for the always present code necessary to initialize the CPU itself, the illustrated embodiment does not require action on the part of any hardware or software component other than what is part of the main processor 1000. One other important distinction is that the agent 5100 may be implemented as a software module resident in the cache 5000. In short, the agent 5100 converts what may be a commodity processing system into a cryptoprocessor with no requirement for hardware modification or, at run-time, any trusted hardware or software components external to the CPU.

Although cache-based encryption of information transmitted from the CPU to system memory can ensure the secrecy of such information, encryption alone does not also ensure its integrity—even encrypted information can be tampered with or even accidentally altered. As FIG. 1 also illustrates, the agent 5100 may therefore also include a validation software module 5120, which computes some form of validation data to associate with what the module 5110 encrypts and has stored in system memory. This validation data could be as simple as a checksum, although in most cases it would be more secure to use any known message integrity algorithm to compute hash values, message authentication codes (MACs), or digital signatures associated with each block of information (such as a page) that is encrypted. The validation module 5120 may then later re-compute the validation data for the same memory block, compare the re-computed validation data with the previously computed and stored validation data, and thereby detect any change, which would be indicated by a mis-match. This verification procedure could be carried out whenever the memory block is to be read, as a background process, or on any other schedule the system designer may prefer.

Encryption does not strictly require validation, and vice versa. Consequently, it would be possible to configure the agent to do validation alone, or to selectively enable both encryption and validation. In other words, the agent may include both the encryption/decryption module 5110, or the validation module 5120 or both (the embodiment illustrated in FIG. 1 and the embodiment that, in the most secure implementation, will be the preferred one). As for a validation-only implementation, this may be sufficient in environments where privacy is not required or desired, but data integrity is. Note that even a validation-only implementation would still have the benefit of the highest level notion in this invention—an agent within the trusted cache of a hardware processor.

Even in implementations that incorporate both modules 5110 and 5120 and corresponding functionalities, it would be possible to make these selectable. For example, one may wish to maintain privacy of data, in which case the encryption module would encrypt that data before it is written to memory, whereas one may not care to incur the performance cost (however slight) of encryption/decryption for other information, such as the already well-known code of a commodity operating system or application. It may be desirable, however, to ensure that even non-encrypted memory blocks (such as pages) have not been tampered with, and in such case validation only may be sufficient. A suitable data structure such as a simple indexed list could then be included in the agent to indicate whether a particular memory block (such as a page) should be or has been encrypted and/or validated.

Figure 2:
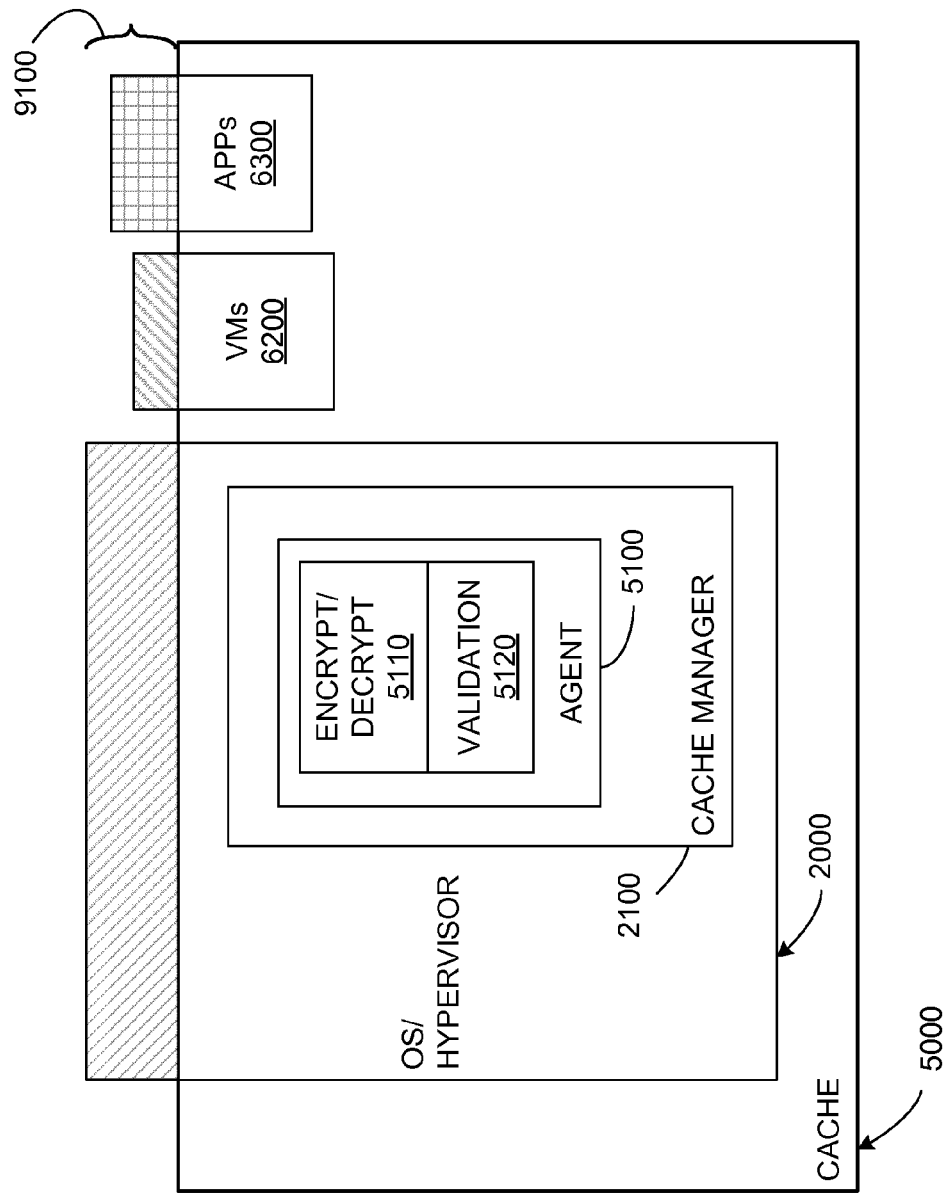
FIG. 2 illustrates an example of an embodiment in which a security/validation component may be part of system software wholly or partially in a CPU cache.

FIG. 2 illustrates, at run-time, the embodiment in which the agent 5100 is a sub-component of the cache management module 2100 of the OS/hypervisor 2000. In other words, in this embodiment, the OS/hypervisor 2000 is modified to include the agent 5100, either as part of an existing cache management module 2100 (if it has other unrelated functions as well), or as the cache management module itself. The cache management module 2100 will maintain the list of pages, pages ranges, etc., that are allowed access to the OS/hypervisor and actively manage the cache, for example, monitor that the cache never misses via the performance counter and takes action if any error is discovered.

As FIG. 2 illustrates, at run-time, the OS/hypervisor 2000 will generally be loaded at last partially into the cache 5000; this is normal even in conventional systems. Depending on their relative sizes in a given implementation, it is possible that the entire OS/hypervisor 2000 may not fit entirely within the cache 5000. In such case, as FIG. 2 illustrates by the shaded upper portion of the OS/hypervisor 2000 extending logically outside the cache 5000, some portion of the OS/hypervisor 2000 may instead be stored until needed in an encrypted system memory region indicated as 9100. As the figure shows, user-level software such as the VMs 6200 and applications 6300 may also be loaded in the cache 5000, at the same time as the system software 2000 and, as needed, portions (shown shaded) of the corresponding code may at least temporarily be moved out to or left in the encrypted system memory region 9100. This is analogous the manner in which memory pages are frequently swapped between system memory and disk storage in conventional computers. In order to ensure proper functioning of all the features of this invention, however, in particular, the feature that only the CPU and agent need to be trusted, all of the agent 5100 should preferably remain resident in the cache throughout run time.

One example of a way to manage the cache content for main processors that lack granular cache control is:

1. Determine the cache geometry and associativity, for example, using supported interfaces or by direct evaluation (for example, one known technique is to measure the time to access memory regions of different sizes; a cache hit is much faster than a cache miss);
2. Determine the maximum set of physical pages that can coexist in the cache for a typical cache that operates on physical addresses. For a processor that instead uses virtual addresses to index cache memory (possibly with additional physical address tagging), the agent 5100 may be configured to manage the assignment of virtual addresses to ensure that all mapped memory can co-exist simultaneously in the cache.
3. Maintain the discovered set of physical pages, for example, as the only pages that can be assigned to virtual addresses to be used by the hypervisor, OS or the application. Note, however (as described below), as one alternative, that virtual-to-physical page mappings and/or specific regions of physical memory can be marked as uncacheable, so arbitrary mappings are also possible provided that the only cachable pages are the ones in the set of physical pages that can co-exist (see step 2 above).

Another example of a procedure to manage the cache content is:

1. Determine the cache geometry and associativity, for example, using known, supported interfaces or by direct evaluation
2. Determine the maximum set of physical pages that can coexist in the cache while noting that the cache operates on physical addresses. As in the method described above, for a processor that instead uses virtual addresses to index cache memory (possibly with additional physical address tagging), the agent 5100 may be configured to manage the assignment of virtual addresses to ensure that all mapped memory can co-exist simultaneously in the cache.
3. Maintain the determined set of physical pages, for example, as the only pages that can be assigned to virtual addresses to be used by the hypervisor, OS or the application. Note, as above, the alternative that virtual-to-physical page mappings and/or specific regions of physical memory can be marked as uncacheable.
4. To read any memory outside the set of pages mentioned above, the OS or hypervisor may use any supported processor methods to read memory into a CPU register while bypassing the cache. Once the copied memory is in a processor register, it is safe to copy the register content into one of the physical pages that occupy the cache.
5. To write any memory outside the set of pages mentioned above, use reverse logic relative to step 4.
6. To protect the CPU cache from access via DMA, configure the IOMMU (provided in many modern processor architectures, such as the x86 architectures) or some other CPU-specific method to block DMA to pages that occupy the cache.

Various methods are known to allow the cache to be bypassed when accessing a particular address or range of addresses. Examples of such methods that are available for, among other architectures, the x86, include: Memory Type Range Registers (MTTRs), which can command the x86 processor not to cache certain memory areas; the PAT extension to the MMU, which controls caching of individual pages; and special non-temporal load and store instructions, such as MOVNTDQ and MOVNTDQA.

In most existing x86 systems, a set of physical pages that can coexist in the CPU cache is any contiguous set of pages that starts on a multiple of the cache size. For example, if the cache size is 8 MB, a first set of pages are the pages that occupy the system address space from [0-8) MB, a second set is the pages that occupy the system address space from [8-16) MB, and so on. This feature can be exploited in various ways to test whether a given set of physical pages can coexist, assuming a software stack that can fit within the tested set of pages. This can be accomplished in various ways, for example, by determining whether cache evictions have occurred using either a processor cache performance counter or a hardware bus analyzer (that is, a "memory protocol analyzer"). These methods comprise, more specifically, the following:

Using the processor cache performance counter.
1. Invalidate the cached content.
2. Read every byte (or other memory unit) in the set of pages to be tested.
3. Record the value of the processor cache performance counter (number of cache misses).
4. Repeat step 2, that is, read every byte (or other memory unit) again.
5. Again read the processor cache performance counter (number of cache misses).
6. Compare the results. If the number of cache misses is the same as in step 3, then all pages coexisted in the cache, since this will show that re-reading the whole range did not cause any miss.

Using a hardware bus analyzer:
1. Read every byte (or other memory unit) in the set of pages to be tested.
2. Using a bus analyzer, start measuring any access to main memory by the main processor.
3. Repeat step 1.
4. Analyze results of the bus analyzer; in particular, search for any reads from the addresses in the set of pages. If there is no read in that range then all the pages coexisted in the cache.

There are other methods for determining if cache misses occur, which may be used instead of the method outlined above. Just one example is to use a device capable of performing non-cache-coherent reads of memory (bypassing the cache).

Another alternate method involves using the x86 INVD instruction to invalidate the cache contents, and then inspecting the associated system memory pages to see if any lines were written back. In particular, the cache region may be filled with an initial pattern and then flushed to memory via WBINVD. The region is then filled with a distinct test pattern, and the cache is invalidated via the INVD instruction. The memory backing the cache is then examined and the information about which lines were evicted may be used to determine the sets of pages that conflict in the cache, in order to find the non-conflicting set. Just one example of a way to determine this would be to observe that any cache lines that do not contain the original pattern must have been evicted due to conflicts when writing the test pattern.

Inspection of the cache as just described can be carried out at different times and by different entities, depending on a given implementation choice. In one embodiment, for example, cache inspection could be done offline and manually for each processor configuration. In another embodiment, a loadable Linux kernel module may run the conflict test. In other embodiments, cache inspection could be done at boot-time when the cache management/agent software is first loaded. In yet other embodiments, such checks could be performed periodically at run-time by the secure OS/hypervisor, as an extra layer of protection to detect any unexpected cache evictions that may have occurred (and allowing them to be scrubbed quickly to reduce the exposure time of sensitive data, as is explained further below).

Yet another approach is to time memory accesses (for example, using the x86 RDTSC "read timestamp counter" instruction) to detect misses, for example, as an alternative to using the cache-miss performance counter.

Note that the more recent generation of Intel x86 processors (starting with those code-named "Sandy Bridge") use so-called "complex cache addressing", where the hardware hashes a memory address to determine where it will reside in the cache. In other words, page coloring in such systems may no longer work. In such systems, the method for computing a set of non-conflicting pages will typically require the generate-and-test procedures outlined above.

In many common systems, a modern hypervisor or OS can be given as a constraint a set of physical pages that are allowed to be used, with the expectation that the hypervisor or OS will respect that constraint and reference only the given pages for execution. One additional step will normally be required, however, to prevent hardware devices from reading the state of the CPU cache. By default, it will normally be possible for devices to issue DMA (direct memory access) requests to read from any system address. If that memory happens to be cached by a DMA-cache-coherent CPU, such as in an x86 system, the CPU will allow access to such memory, which could defeat the trust module and expose the software state.

An IOMMU (I/O memory management unit) 1300 is a device configurable by software that can restrict hardware devices from accessing system addresses, such that a device cannot read or write to memory that hasn't been explicitly allocated (mapped) for it. Many commodity processors include the IOMMU as part of the CPU circuitry itself; in other cases, it will be a separate component, in which case known measures will need to be taken to ensure its security. In addition to an IOMMU, some CPUs have other technologies that can provide DMA protection, for example, the Intel x86 TXT technology. One method to provide DMA protection is therefore to use the IOMMU, although it is possible to implement various embodiments of this invention using other CPU-specific alternatives. To mitigate access to the CPU cache by devices, an IOMMU may therefore be configured to prevent such access. This is normally done by configuring the IOMMU so that each page in the set of pages occupying the cache will have no mapping, or a mapping to an invalid address range, such as an address that is not mapped by any device or memory in the system address space. In normal operation, the software stack will not require any of the devices to read from the memory that occupies the cache, so normal operation can be expected. If a malicious hardware device attempts to read the software state, however, this will be prevented by the IOMMU. One exception to this are some pages that occupy the cache and are knowingly selected by the software stack for I/O communication with devices. For such pages, the IOMMU will be configured to map the pages so that they are allowed to be accessed by hardware devices. One reason for having such pages is that some old hardware devices may be able to address only small amounts of the address space; for example, ISA devices can address only the first 16 MB of the system address space. Communicating with such devices might therefore need to happen using memory that is within the cache.

Even when allowing access to certain pages inside the cache for I/O purposes, however, the pages that are allowed access for devices are only those that are used at that point in time for I/O communication. Once I/O communication is completed, the IOMMU protection can be established once again and the page can be used for other purposes, such as for running other software code. Note that this is not a security risk, as the agent is aware of any page being used for I/O and can treat it accordingly.

Since the agent 5100 contains executable code loaded in the CPU cache 5000, and this cache is empty at the time the CPU is first powered on or after a reset, the issue arises as to how to load the agent in a secure manner. Each processor architecture will have different ways to address this issue that skilled designers will know how to use, but for the purpose of illustration, assume that the invention is to be implemented in a system based on the current x86 architecture. As mentioned above, Intel at present provides the Trusted Execution Technology (TXT), which includes a Trusted Platform Module (TPM) chip as a hardware extension of the x86-type CPU. TXT is a known method for authenticating software launch on a system with a TPM. According to some proposals, the TPM may be incorporated into the CPU itself in the future. FIG. 1 shows these as TXT 3000 and TPM 3100.

One method to arrange secure loading of the agent 5100 is as follows:

0) Using a trusted system, compute a hash value of the code to be loaded as the agent 5100 and store this securely.
1) Load agent loader code in the system main memory as with other applications. At this stage, the agent code might be visible in main memory, and therefore might come under malicious attack.
2) Following Intel-specified and therefore known operation of the TXT technology, execute the agent loader code in an MLE (Measured Launch Environment) to load the agent 5100 into the cache 5000 and record the agent hash value in the TPM 3100. The MLE will provide protection from DMA for all the agent loader code. At this stage, there are no secrets loaded in memory, only the agent loader code.
3) Rehash the cached agent code and, via a remote system, communicate with the TPM (through a preferably dedicated network agent) and compare this rehashed value with the previously stored agent hash value. If these two hash values match, then the cached agent will be authenticated, that is, it will be known that at run-time it is running unmodified.
4) Private information (storage keys, VM images, etc.) may now be communicated to the host running the agent 5100 since the agent, now securely loaded, will ensure that all execution happens only within the CPU cache. Note that it is possible for a CPU to generate encryption keys securely that reside in the cache with no need for communication external to the CPU itself.

Figure 3:
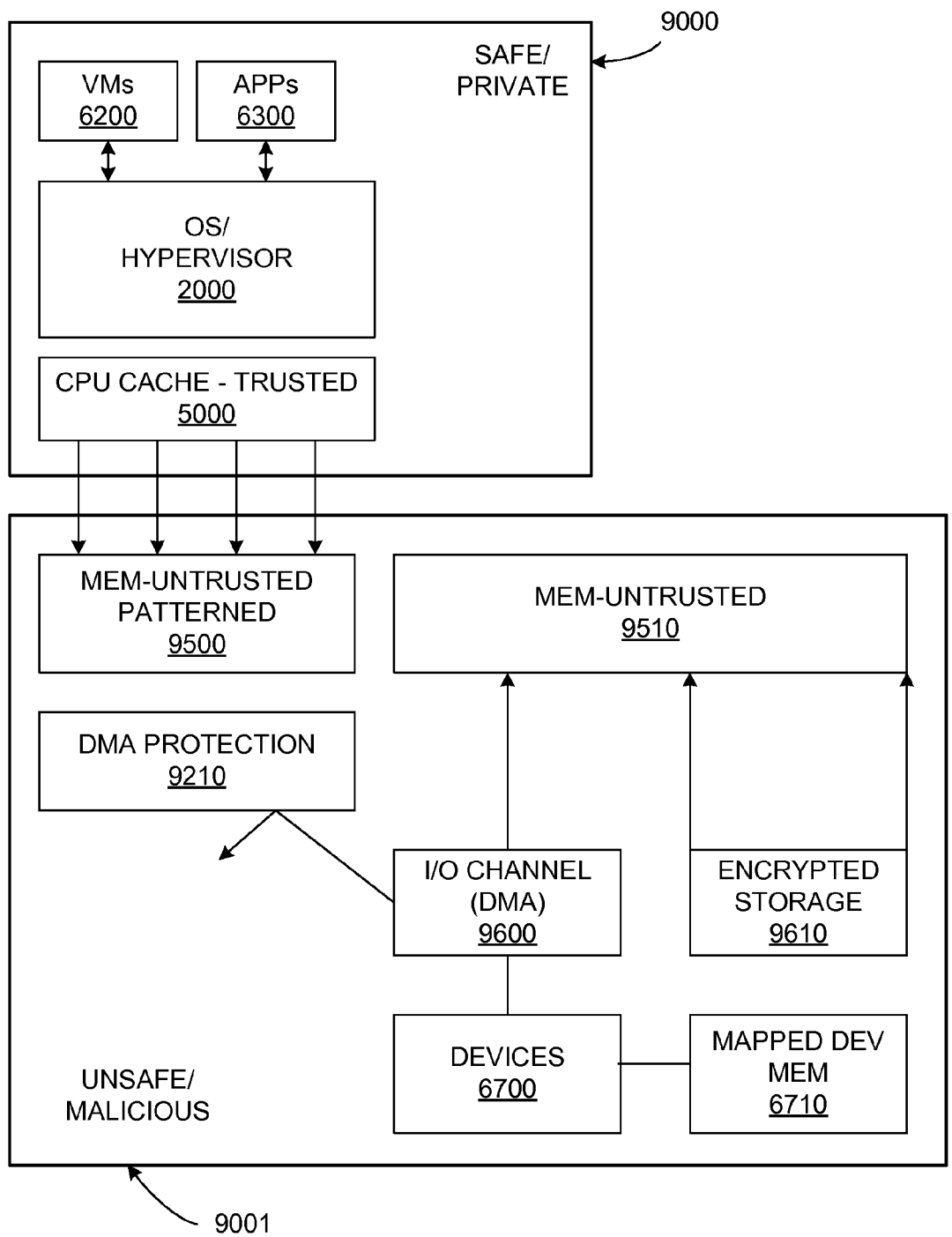
FIG. 3 illustrates the interaction with system memory by various hardware and software components in typical implementations.

FIG. 3 illustrates the interaction with system memory by various hardware and software components in typical implementations, and also illustrates how the invention is able to support not only operations with system memory, but also I/O devices that may include memory of their own. FIG. 3 also illustrates the distinction between safe/private system memory address regions (9000) and unsafe, potentially malicious system memory address regions (9001).

As for safe/private memory 9000, in general, any memory currently in the cache 5000 may be considered safe to access—it is trusted. Information in memory that has been encrypted by the agent, although not trustworthy in the sense of cached information, is nonetheless safe by virtue of the encryption and further by validation. Software in the stack may consider such address regions as safe in the sense that they view the system memory that they address to be physical addresses, but in reality are within the cache 5000 and can therefore be trusted. In other words, the software stack thinks that it is addressing system memory as usual, but is in reality addressing the cache 5000.

Note that encryption by the module 5110 (FIG. 1) provides confidentiality of the information stored in these memory regions (including such information as the state of the virtual machines 6200 and applications 6300 and any portions of the OS/hypervisor 2000 that cannot fit in the cache 5000); validation by the module 5120 (FIG. 1) provides data integrity; but actual availability is not guaranteed. Thus, a malicious entity could still tamper with code or data, but this tampering would be detected as explained above: tampering would cause a mismatch in the hash or other validation data for the affected block. Note that even without the validation module 5120 and its related operations, tampering with executable code stored in encrypted form would almost certainly lead to detectable runtime errors or an outright failure of the affected code to make forward progress.

In FIG. 3, the software stack 2000, 6200, 6300 is shown as being outside of the cache. This is merely for sake of illustration. As explained above, at run-time most and preferably all of the OS/hypervisor 2000, in particular, the agent 5100, will be resident in the trusted cache 5000, as well as any other parts of the stack (such as VMs 6200 and/or applications 6300) that the OS/hypervisor 2000 chooses to load into the cache as well for conventional performance reasons.

Unencrypted memory regions 9001 cannot be trusted and are not safe from attack. In general, any memory not currently in the cache is considered unsafe and must be encrypted by the agent to prevent privacy and integrity attacks. The un-trusted memory space 9001 includes normal system memory as used by a conventional system. No special attributes need to be associated with a particular address in such a system memory space, which can therefore be used by executing code (although preferably not code itself), storage or device I/O. As explained above, the un-trusted memory space may also be used to store executable code that is encrypted/validated; this code may be paged in and executed after re-validation and decryption by the agent 5100.

Unencrypted system memory may not be the only mappable memory in the overall system. Depending on what they are and how they are built, devices 6700 may, for example, be able to access their own dedicated, typically onboard device memory 6710 (such as the memory on a video card). Note that, even in conventional systems, it is rare to map device memory 6710 for any purpose other than I/O with devices; in particular, code is not typically executed from device memory. As the CPU cache 5000 provides access to system addresses, some of the addresses might not be backed by system memory at all; instead, they might be backed by the device memory 6710, for example, a video card with 512 MB, which is not part of the system memory, but in theory can be used as such.

Devices may also be enabled to access an untrusted system memory address space 9510 via a DMA I/O channel 9600. In a trusted setup, however, DMA protection 9201 (for example, provided by IOMMU 1300—see FIG. 1) is configured to prevent access to the system address ranges that occupy the CPU cache. This is symbolized by the arrow from the I/O channel 9600 "bouncing off of" the DMA protection module 9210. This IOMMU protection mechanism is described in greater detail above.

The encrypted storage region 9610 shown in FIG. 3 is simply undedicated memory. For a system that does not trust the system memory in general, it is beneficial to include a region such as 9610 as an untrusted storage area to store an encrypted RAM disk, as encrypted swap storage, etc. This can improve performance compared to slow storage devices, and can compensate for the limited processor cache size.

A system memory area that backs the CPU cache is indicated as 9500. As one example, this area might contain zeros or other patterns (for example, randomly generated bits, in which case the seed should be stored for subsequent recomputation and validation) that indicate and validate that no memory is leaked back from the cache to system memory, such as by an accidental write-back. In other words, if, upon later inspection by the agent, the system memory region 9500 does not contain the same pattern, then the system will know there has been some cache leakage. Some pattern other than all zeroes has the advantage that a reset won't be confused with a correct state. Note that this backing memory region 9500 is still not to be trusted, as it is neither in the cache nor in a region of encryption, but it may still be safely used by the agent as described.

The region of non-conflicting memory 9500 may also be used during the initial loading of the agent 5100. One example of a procedure that uses the cache-backing memory region 9500 includes the following steps:

1. T0: The image of the OS/hypervisor 2000 kernel image is read into the memory region 9500. At this point, all information in region 9500 may be in plain text, that is, none of the information is yet safe.
2. T1: The OS/hypervisor kernel initializes the agent 5100, (which will then manage the caching property of physical memory to limit the kernel to only the set of non-conflicting pages), configure the IOMMU, and enter into the proper run-time state.
3. T2: The agent 5100 fills the memory range 9500 backed by the cache with the eviction-detection-fill-pattern.
4. T3-Tn: The system is run from the cache only. Note that the memory region 9500 backing the cache is not an encrypted version of the running state; rather, it is "stale" memory containing a fill pattern. Periodically, the agent 5100 may examine the memory region 9500 to check that this fill pattern is intact, and, thereby, to detect if any cache lines have leaked due to eviction.

It is well known that caches operate on aligned, contiguous chunks of data, referred to as cache lines. For example, 64 bytes is a common cache line size in modern x86 processors, and movement of data between the cache and system memory occurs at cache-line granularity. The processor cache is typically organized in a set-associative manner; each cache index can store up to N cache lines in an N-way set-associative cache. For modern x86 processors, N is commonly 8 or 16. The processor typically employs a deterministic mapping from memory addresses to cache indexes, such that a large number of lines in system memory will be mapped to the same cache index, although the cache may only hold up to N of them at a time. When more than N memory addresses that map to the same cache index are accessed, they cannot all fit in the cache at the same time, resulting in cache evictions. Modern processors commonly employ a least-recently-used (LRU) policy (or some approximation) to determine which already-cached line to evict in order to make space for a newly-accessed line from system memory. When a modified (also known as "dirty") line is evicted, it is written back to system memory. In general, processors do not provide any way for software to interpose on cache evictions or writebacks.

This invention does not rely on the existence of special hardware support or processor modes for locking down portions of the cache contents, as required by the "bus encryption" method described in Xi Chen, Robert P. Dick, and Alok Choudhary. "Operating System Controlled Processor-Memory Bus Encryption", in Proceedings of Design, Automation and Test in Europe, (DATE 2008), Munich, Germany, March 2008, or the CARMA system (cited below).

Uncontrolled cache evictions leak data from trusted cache memory to untrusted system memory, violating privacy. Also, a subsequent access to an evicted line will load data from untrusted system memory into the trusted cache, enabling an attacker to violate integrity. As a result, effective cache management is essential for preserving the privacy and integrity of both code and data. One key challenge is therefore preventing evictions from cache conflicts, a problem that is not discussed in related work. This involves carefully selecting the portions of memory that are allowed to be cached, and marking the rest of memory uncacheable. In general, the processor memory management unit (MMU) 1200 (FIG. 1) permits software to control, map, and protect memory at the granularity of pages, which are typically much larger than individual cache lines. For example, the smallest page size is 4096 bytes for x86 processors.

One method for addressing this issue is: 1) Find a non-conflicting set of pages; then 2) use only these pages for running the current software, since only these pages will have a caching policy that allows the CPU to cache them; remaining pages in the system will typically have a caching policy that prevents caching. Since the set of pages that need to be found as non-conflicting are the only pages ever to be mapped into the cache, even when data is read from the rest of the untrusted memory, it is still read in such a way that does not place them into the cache and that generally will not cause eviction of memory that is currently in the cache.

The set of non-conflicting pages depends on the particular function used by the processor to map memory addresses to cache indexes, which in turn depends on details of the processor implementation. In some cases, once the cache organization (size and associativity) is determined, the mapping can be computed and controlled via page coloring. In other cases, such as the most recent generations of Intel x86 processors (starting with "Sandy Bridge"), the mapping is an opaque, complex hash function that is not disclosed by the processor vendor. As a result, an experimental approach is required to find a suitable set of non-conflicting pages, which in turn demands a reliable procedure for detecting conflicts. PrivateCore has developed several eviction-detection techniques, including methods that bypass the cache to perform non-coherent reads from system memory, as well as methods that involve monitoring hardware performance counters. The further ability to detect evictions at runtime, during production system operation, is also important, in order to catch and scrub any unexpected leaks quickly and reduce exposure time.

At this point, those skilled in computer security at the system level will appreciate some of the advantages of the various aspects of this invention relative to other solutions proposed in the literature. One clear advantage is that the software-only approach of the invention does not require any special hardware support, and may even be used with commodity hardware, such as systems based on modern Intel x86 processors. If both encryption/decryption and validation features are implemented (not required) then the disclosed system is designed to guarantee both privacy (confidentiality) and integrity for all code and data in the system.

The trusted computing base (TCB) of the implementation of the invention described above does not need to extend beyond the processor, and may operate according to a threat model that explicitly assumes that all other hardware is untrusted and potentially malicious. However, for secure launch and attestation, the TCB should preferably also encompass the components required to establish a root of trust, such as Intel Trusted Execution Technology (TXT), which may include off-processor Trusted Platform Module (TPM) hardware in some implementations.

In particular, system memory itself may be considered untrusted, and its contents may be assumed to be vulnerable to being read or written by an attacker, violating privacy or integrity, respectively. Similarly, all other hardware devices and interconnects outside the processor are untrusted, and potentially under the control of an attacker. For example, a compromised I/O device, such as a common network interface card (NIC) capable of performing DMA, may be exploited to violate privacy or integrity by maliciously inspecting or corrupting the contents of code and data in main memory or caches.

In this invention, the only memory that needs to be trusted is the processor cache, which is a physically-integrated part of the processor itself; any other memory that is used may be encrypted or, in the case of device memory or possible DMA, controlled using IOMMU. This contrasts with the Cryptkeeper system described in Peter A. H. Peterson, "Cryptkeeper: Improving Security with Encrypted RAM", in IEEE International Conference on Technologies for Homeland Security (HST 2010), November 2010. Cryptkeeper divides main-memory into separate cleartext and encrypted portions, and does not attempt to manage cache contents; all RAM is cacheable. As a result, Cryptkeeper fails to preserve privacy for its cleartext memory region, making an explicit choice to allow some memory contents to be leaked, in order to improve performance. Note that even if Cryptkeeper reduced the size of its cleartext region to fit in the cache, without additional modifications, accesses to encrypted regions would still induce cache evictions and therefore leak cleartext data back to memory. Cryptkeeper also does not address integrity, and thus does not provide protection against attacks that modify or corrupt code and data in either the cleartext or encrypted portions of RAM.

Similarly, the bus-encryption scheme proposed in Chen, et al., cited above, assumes that an attacker is "unable to tamper with the contents of memory" and unable to "modify the kernel", which is assumed to reside in read-only non-volatile memory off-processor, as is the case for some embedded systems.

Merely by way of comparison with an approach proposed publicly only after the priority date of this application, the CARMA system described in Amit Vasudevan, Jonathan M. McCune, James Newsome, Adrian Perrig, and Leendert van Doorn. "CARMA: A Hardware Tamper-Resistant Isolated Execution Environment on Commodity x86 Platforms", in Proceedings of the ACM Symposium on Information, Computer and Communications Security (ASIACCS 2012), Seoul, Korea, May 2012, relies on cache memory exclusively, so that system memory is never accessed and need not be present. The authors state explicitly that "execution will be entirely within cache and not interact with untrusted RAM", and that they were able to successfully remove all DRAM in a prototype implementation. This choice constrains the types of workloads that can be supported by CARMA significantly; in particular, it makes CARMA essentially useless for large, general-purpose VMs, complicated applications, or most unmodified commercial software, which are almost all too big to fit entirely within the cache. Moreover, the only mechanism CARMA includes for any notion of support for I/O devices is via an in/out command to passive devices, initiated by the CPU itself. This is a severe restriction as compared with the present invention, which enables even devices to initiate memory writes, through shared memory, in order to share data with the CPU.

The TRESOR system (mentioned also above) described in Tilo Willer, Felix C. Freiling, and Andreas Dewald. "TRESOR Runs Encryption Securely Outside RAM", in Proceedings of the 20th USENIX Security Symposium, San Francisco, Calif., August 2011, is designed to address the more limited problem of storing disk encryption keys securely, so that physical attacks on RAM cannot compromise encrypted disk contents. TRESOR stores encryption keys in privileged machine-specific processor registers (x86 debug registers), and implements the AES encryption algorithm without storing any sensitive information in RAM. In contrast to the architecture of the invention described in this application, which protects privacy and, optionally, integrity for all code and data in the system, TRESOR protects only encryption keys. The approach of using privileged processor registers to store information securely does not scale beyond a very small amount of state; TRESOR is, for example, able to store only 256 bits securely (in four 64-bit debug registers), just enough to hold a single AES-256 key. This (mis)use of the x86 debug register mechanism also precludes its intended use for hardware breakpoints and watchpoints. Furthermore, without privacy and integrity protection for the whole code and data, an attacker can manipulate the TRESOR implementation, and through that alteration, gain access to the keys stored in CPU debug registers.

We claim:

1. A method for securing information stored by a computer, the computer having a processor and a main memory, the processor having a core with cache memory for storing instructions for execution by the core, the method comprising:
   loading an agent into the processor and storing the agent into the cache memory so that the agent is resident in the cache memory; and
   under control of the core executing instructions of the agent:
      upon detecting transmission of encrypted content from the main memory to the cache memory,
         retrieving the encrypted content from the cache memory;
         decrypting the encrypted content; and
         storing the decrypted content into the cache memory;
      when the decrypted content is to be evicted from the cache memory to the main memory,
         retrieving the decrypted content from cache memory;
         encrypting the decrypted content as newly encrypted content; and
         storing the newly encrypted content into the cache memory so that the encrypted content, rather than the decrypted content, is evicted.

2. The method of claim 1, further comprising detecting transmission of encrypted content from the main memory to the cache memory based on a page fault resulting from accessing a page that contains the encrypted content.

3. The method of claim 1, wherein the agent is part of a cache management module of an operating system.

4. The method of claim 1, wherein the main memory includes a memory address space, wherein the method further comprises:
   organizing the memory address space into memory blocks;
   determining a non-cache-conflicting set of the memory blocks; and
   marking the non-cache-conflicting set of the memory blocks as cacheable to preventing cache conflicts by the main memory.

5. The method of claim 1, further comprising:
   storing a data pattern in a cache-backing memory region; and
   inspecting contents of the cache-backing memory region to determine a change in the data pattern, said change in the data pattern being indicative of eviction of at least a part of the contents in the cache-backing memory region.

6. The method of claim 1, further comprising prior to loading the agent into the processor, calculating and storing a first hash value of the agent.

7. The method of claim 6, further comprising:
   after storing the agent into cache memory,
      calculating a second hash value of the agent stored in the cache memory; and
      comparing the second hash value with the first hash value to determine whether the agent has been modified.

8. A system for securing information stored by a computer, comprising:
   a processor having a core with cache memory;
   a main memory;
   an application for accessing sensitive content that is stored in main memory as encrypted content; and
   an agent stored in the cache memory so that the agent is resident in the cache memory, wherein the agent is configured to:
      detect that the application has executed an instruction to cause the encrypted content to be transmitted from main memory to the cache memory;
      decrypt the encrypted content that is stored in cache memory;
      store the decrypted content into the cache memory; and
      cause control to be passed to the application for accessing the decrypted content.

9. The system of claim 8, wherein the agent is further configured to:
   when the decrypted content is to be evicted from the cache memory to the main memory,
      encrypt the decrypted content as newly encrypted content; and
      store the newly encrypted content into the cache memory so that the encrypted content, rather than the decrypted content, is evicted.

10. The system of claim 8, wherein the agent detects that the application has executed an instruction to cause the encrypted content to be transmitted from main memory to the cache memory based on a page fault resulting from accessing a page that contains the encrypted content.

11. The system of claim 8, wherein the agent is part of a cache management module of an operating system.

12. The system of claim 8, further comprising a component configured to, after storing the agent in cache memory, calculate a hash value of the agent and comparing to the calculated hash value to a previous hash value to determine whether the agent has been modified.

13. The system of claim 8, further comprising a trusted platform module component configured to load the agent into the processor and store the agent into the cache memory before execution of other software.

14. The system of claim 8, further comprising:
   prior to loading the agent into the processor, calculating and storing a first hash value of the agent; and
   after storing the agent into cache memory,
      calculating a second hash value of the agent stored in the cache memory; and
      comparing the second hash value with the first hash value to determine whether the agent has been modified.

15. The system of claim 8, further comprising:
   storing a data pattern in a cache-backing memory region; and
   inspecting contents of the cache-backing memory region to determine a change in the data pattern, said change in the data pattern being indicative of eviction of at least a part of the contents in the cache-backing memory region.

16. The system of claim 8, wherein the encrypted content includes an instruction for execution by the core.

17. A computer-readable medium that is not a transitory, propagating signal storing instructions of a computer for securing content, the computer having a processor and a main memory, the processor having a core with cache memory, the instructions for execution by the core, the instructions comprising:
  instructions of an agent that intercept a transmission of encrypted content from the main memory to the cache memory as a result of software accessing the encrypted content, decrypt the encrypted content that is stored in the cache memory, and store the decrypted content into the cache memory so that the software can access the decrypted content; and
  instructions of the agent that, prior to the decrypted content being transmitted from the cache memory to the main memory, encrypts the decrypted content as newly encrypted content wherein the newly encrypted content, rather the decrypted content, is transmitted to main memory.

18. The computer-readable medium of claim 17, wherein the instructions further comprise instructions that store the instructions of the agent into the cache memory so that the agent is resident in the cache memory.

19. The computer-readable medium of claim 17, wherein the agent the instructions that intercept detect that the software has executed an instruction to cause the encrypted content to be transmitted from main memory to the cache memory based on a page fault resulting from the software accessing a page that contains the encrypted content.

20. The computer-readable medium of claim 17, wherein the software agent is part of a cache management module of an operating system.

\* \* \* \* \*